(12) United States Patent
Webber

(10) Patent No.: US 10,437,598 B2
(45) Date of Patent: Oct. 8, 2019

(54) METHOD AND APPARATUS FOR SELECTING AMONG A PLURALITY OF INSTRUCTION SETS TO A MICROPROCESSOR

(75) Inventor: Andrew Webber, Hertfordshire (GB)

(73) Assignee: MIPS Tech, LLC, Campbell, CA (US)

( * ) Notice: Subject to any disclaimer, the term of this patent is extended or adjusted under 35 U.S.C. 154(b) by 117 days.

(21) Appl. No.: 11/704,725

(22) Filed: Feb. 9, 2007

(65) Prior Publication Data

US 2007/0204134 A1 Aug. 30, 2007

(30) Foreign Application Priority Data

Feb. 10, 2006 (GB) .................................. 0602730.4

(51) Int. Cl.
*G06F 9/38* (2018.01)
*G06F 9/30* (2018.01)

(52) U.S. Cl.
CPC .......... *G06F 9/3822* (2013.01); *G06F 9/3017* (2013.01); *G06F 9/30181* (2013.01); *G06F 9/30196* (2013.01); *G06F 9/3802* (2013.01)

(58) Field of Classification Search
USPC ........................................................ 712/209
See application file for complete search history.

(56) References Cited

U.S. PATENT DOCUMENTS

| | | | | |
|---|---|---|---|---|
| 5,115,500 A | * | 5/1992 | Larsen | G06F 9/30 365/230.06 |
| 5,568,630 A | * | 10/1996 | Killian et al. | 712/200 |
| 5,568,646 A | * | 10/1996 | Jaggar | 712/209 |
| 5,968,162 A | * | 10/1999 | Yard | G06F 9/30181 712/203 |
| 6,021,265 A | | 2/2000 | Nevill | |
| 2002/0161989 A1 | * | 10/2002 | Swaine | 712/227 |
| 2002/0199083 A1 | * | 12/2002 | Kao | G06F 9/30156 712/209 |
| 2003/0128140 A1 | * | 7/2003 | Xie | H03M 7/4006 341/107 |
| 2004/0255097 A1 | * | 12/2004 | Seal | G06F 9/30149 712/209 |

FOREIGN PATENT DOCUMENTS

| | | |
|---|---|---|
| EP | 0 324 308 A2 | 7/1989 |
| EP | 1 050 798 A1 | 11/2000 |
| EP | 1 089 167 A2 | 4/2001 |
| EP | 1 168 159 A1 | 1/2002 |

(Continued)

OTHER PUBLICATIONS

Goudge et al., Thumb: Reducing the Cost of 32-bit RISC Performance in Portable and Consumer Applications, Feb. 1996, pp. 176-181.*

(Continued)

*Primary Examiner* — George Giroux
(74) *Attorney, Agent, or Firm* — Adams Intellex, PLC

(57) ABSTRACT

A method and an apparatus are provided for selecting between a plurality of instruction sets available to a microprocessor. An instruction fetch address is supplied. At least one predetermined bit of the instruction fetch address is used to select between the instruction sets. Once an instruction set has been selected, instructions may be fetched and decoded with a decoding scheme appropriate to the instruction set.

12 Claims, 2 Drawing Sheets

(56) References Cited

FOREIGN PATENT DOCUMENTS

| | | |
|---|---|---|
| GB | 2311 882 A | 10/1997 |
| JP | 62-40538 | 2/1987 |
| JP | 1-201729 A | 8/1989 |
| JP | 9-512651 A | 12/1997 |
| JP | 2002-304297 A | 10/2002 |
| JP | 2006-527435 A | 11/2006 |
| WO | WO 99/18486 | 4/1999 |
| WO | WO 00/45257 A3 | 8/2000 |

OTHER PUBLICATIONS

Aditya et al. (Automatic Design of VLIW and EPIC Instruction Formats, Apr. 2000, pp. 0-110).*
Great Britain Search Report dated May 3, 2006.
Introduction to ARM thumb, Lemieux, Embedded Systems Design, 2003, p. 1-4.
International Search Report dated Jun. 6, 2007.

* cited by examiner

METHOD AND APPARATUS FOR SELECTING AMONG A PLURALITY OF INSTRUCTION SETS TO A MICROPROCESSOR

FIELD OF THE INVENTION

This invention relates to a microprocessor and instruction sets which may be used by such a processor, and particularly to multithreaded processors and their instruction sets.

BACKGROUND OF THE INVENTION

In British Patent No. GB-A-2311882, a multithreaded processor is described. A single processing unit has a plurality of inputs and outputs, corresponding to a plurality of processing threads which are to execute on the processor. The processor arbitrates between the threads to determine which one should be executed on each block cycle. This process is typically done on a prioritization basis. Further, the development of this process has concerned about monitoring factors such as time since execution starts for a thread, and time to a specific deadline when the thread must execute. This idea can be embodied in processors directed to a general processing, and also in application specific processors such as Digital Signal Processors (DSP).

A number of different threads can be arranged to execute on one of these processors, but DSPs typically use between two and four threads. The number of threads is defined at the design and manufacture stage of the chip, and the chip is configured with an appropriate number of inputs and outputs.

A typical processor uses a 32 bit instruction set which may be extended via template instructions used to retrieve additional instructions.

Some processors (not multithreaded) have been produced with smaller than standard instruction sets. This leads to a reduction in the code size of a program used by such a processor. The processor will be configured to switch between the large and the reduced instruction sets using special instructions. Each time a new instruction set is added, additional switching instructions have to be added to have the new instruction set accessed.

Many applications to which multithreaded processors can be put include embedded and low power requirements. Such requirements constrain the amount of memory available in the systems for data such as programs. As a result, microprocessor manufacturers have aimed to improve their devices by compressing program code. This is most commonly achieved by supporting instruction subsets which can be implemented when a smaller instruction set is required. For example, a processor with the 32 bit instruction set may also be able to support a special 16 bit instruction set to make the programs smaller.

Again, the switch between the instruction sets is handled by use of the special instruction to switch between the sets. The switch requires the special instruction and an additional clock cycle to perform the switching.

SUMMARY OF THE INVENTION

The present invention provides a processor which is able to support more than one instruction set. The processor does not require additional instructions to switch between the instructions sets. Accordingly, a specific combination of instruction address bits is used to identify an instruction as belonging to a specific set. As a result, in order to switch between the instruction sets, the system jumps between different areas of an instruction memory to retrieve the instructions from an appropriate set. Preferably at least two instruction sets are provided, and the invention may be embodied in a multithreaded processor.

BRIEF DESCRIPTION OF THE DRAWINGS

A preferred embodiment of the invention is now described with drawings, in which.

DETAILED DESCRIPTION

Figure 3:
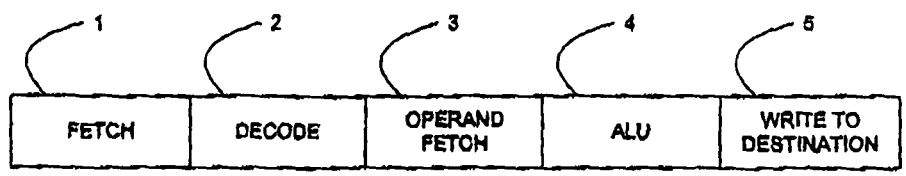
FIG. 3 shows a typical processor pipeline for an instruction.

A processor pipeline for an instruction thread shown in FIG. 3 comprises five portions. First, an instruction fetch portion 1 is typically a 32 bit fetch instruction which includes an address of the instruction to be fetched from an instruction memory. The instruction fetch portion is followed by a decode step 2 in which the instruction retrieved from the memory is decoded into a machine code for an execution on the microprocessor. An operand fetch 3 comprises a further fetch. The operand fetch 3 retrieves any data which is to be operated by the fetched and decoded instruction.

An Arithmetic Logic Unit (ALU) 4 executes the fetched and decoded instruction on the operand. At step 5, the result of the executed instruction is written to a destination in the memory through a respective processor output.

In an embodiment of the invention, specific bits of the fetch instruction are used to indicate that a different instruction set is to be used. This instruction set will preferably be stored in the same instruction memory as a first instruction set. Two or more instruction sets can be stored, and an appropriate number of bits is used to select between the sets. In this example, bits 20 and 23 are used to select between two instruction sets. When both bits 20 and 23 are set to 1, the fetch instruction will retrieve the addressed instruction from the second set of instructions stored in the instruction memory rather than the first instruction.

As both instruction sets are stored in the instruction memory, the address portion of the fetch instruction defines where in the instruction memory the instructions come from, but the bits 20 and 23 are used when both bits are set to 1 to select between the decoding which is applied to the fetched instruction. Thus, when both bits are set to 1, an instruction decoder for the second instruction set is used. Any other combination will result in the instruction decoder for the first set of instructions. Obviously with two bits, a total of four states could be supported and therefore a total of four instruction sets could be selected between using these two bits. Additional bits could be included if further instruction sets are to be used. If only two instruction sets are implemented, then only a single set is required to select between them.

Figure 1:
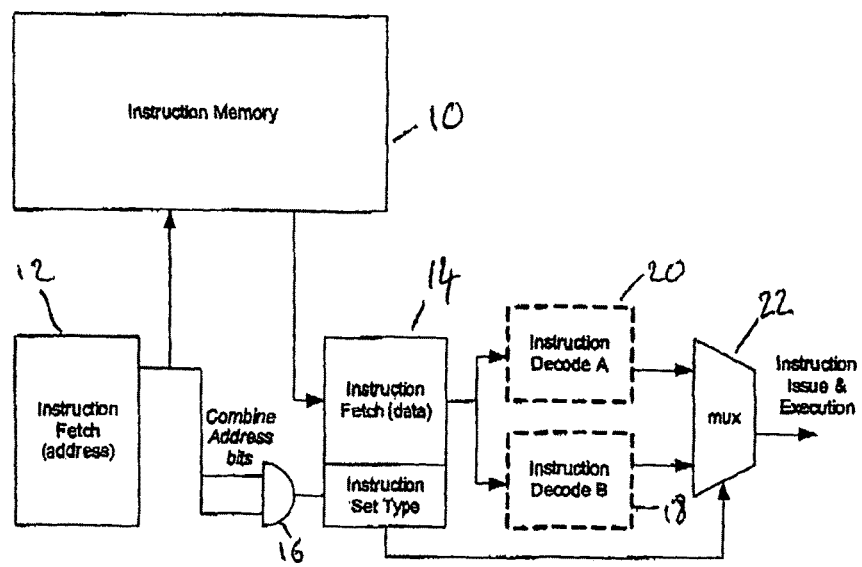
FIG. 1 is a schematic block diagram of an instruction fetch and a decode unit for use in an embodiment of the invention.
Figure 4:
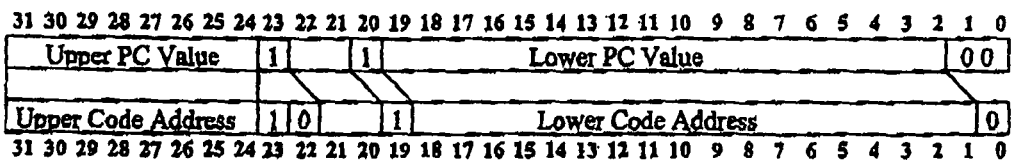
FIG. 4 shows a bit map of a type used in the instruction fetch address for use in the arrangements of FIG. 1 and FIG. 2.

The way in which this fetch address shown in FIG. 2 affects the operation of the system is now explained with reference to FIG. 1. FIG. 1 comprises an instruction memory 10. Instructions are retrieved from the instruction memory 10 in response to an instruction fetch address 12 (as shown in FIG. 4). The instruction address is supplied to the instruction memory 10 which reads the appropriate instruction out and sends it to a fetched instruction unit 14.

At the same time, an AND gate 16 receives bits 20 and 23 of the instruction. The output of this is supplied to an instruction set type portion of the fetch instruction unit 14. Where more than two bits are used to select between instruction sets, more complex gating, or possibly a multiplexer, will be required.

If the output of the AND gate is a 1, then this indicates that bits 20 and 23 are both set to 1 and the instruction set type therefore corresponds to the second set of two instruction sets.

The fetched instruction unit 14 sends the fetched instruction to two instruction decoders A and B, 20 and 18 respectively. These decoders 20 and 18 simultaneously decode the fetched instruction and give alternative decoded instructions at their outputs.

When the combined address bits indicate that the instruction set type is the first instruction set A, the output of the instruction decoder A 20 is required. When the instruction set type indicates that the second set of the instructions is required, the output of the instruction decoder B 18 is required. Selection between the outputs of the instruction decoders A and B, 20 18 is performed in a multiplexer 22. The selection input of this is controlled by an output of the instruction set type portion of the fetched instruction unit 14. As previously explained, the instruction set type is determined by the combined address bits from the AND gate 16.

The selected decoded instruction is then provided as an output from the multiplexer to the ALU for an execution in a conventional manner.

An alternative to the arrangement of FIG. 1 would be to route only the fetched instruction data to the instruction decoder appropriate to the instruction set type. This would involve positioning the multiplexer between the fetched instruction data unit 14 and the two instruction decoders 20 and 18.

In the implementation shown, the first instruction set would typically contain 32 bit wide instructions from the first set or 16 bit instructions from the second set. After decoding, all of the instructions are in 32 bit wide form, and the 16 bit instructions are used to form suitable instructions from the main processor instruction set, such as a subset of these instructions.

This is explained with reference to FIG. 4. As seen in FIG. 4, a specific transformation is performed on the program counter address (PC) to obtain the instruction fetch address. The idea behind this transformation is that the PC addresses are always 32 bit aligned (bottom bits both zero). If it is decided to switch to a second 16 bit wide instruction, it is necessary to use a smaller 2 byte aligned word. This transformation is effectively a logical shift right by 1 of bit 22 with a new bit zero being inserted at bit 22. This has the effect of incrementing the program counter by 16 bits at a time instead of 32 bits and thereby enabling 16 bit words to be retrieved from the memory.

Figure 2:
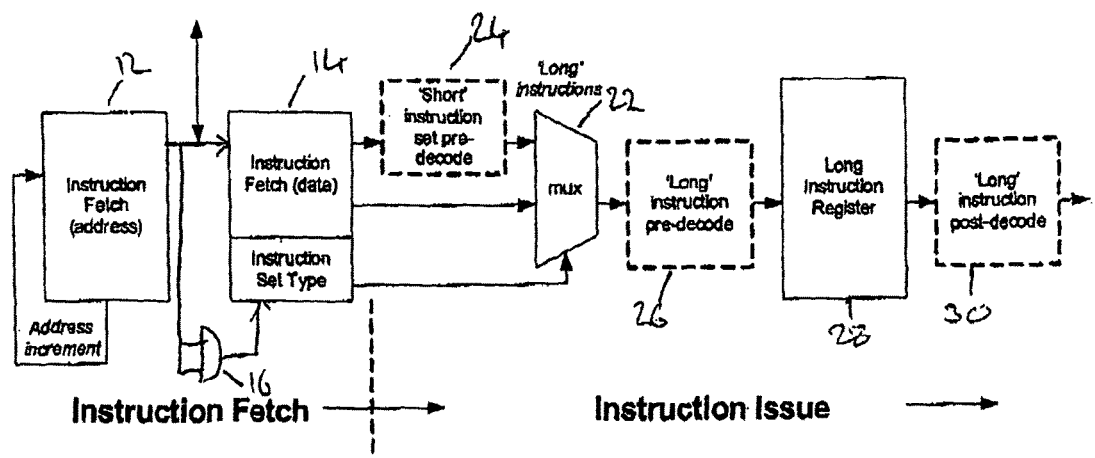
FIG. 2 shows an alternative representation of the instruction fetch and the decode unit for use in the embodiment of the invention.

The arrangement of FIG. 2 shows an alternative representation of the instruction retrieval and decoding when using multiple instruction sets. The external instruction memory 10 is not shown here. An instruction fetch unit 12 again is used to send instruction fetch requests to the instruction memory 10. The retrieved instructions are supplied to a fetched instruction unit 14. The bits 20 and 22 are again combined in the AND gate 16 to determine the instruction set type and to control the multiplexer 22.

A fetched instruction can be passed to the multiplexer 22 via a short instruction pre-decode unit 24, or passed directly to the multiplexer 22.

The output of the short instruction set pre-decode unit 24 which is used to operate on a reduced 16 bit instruction set is a 32 bit wide long instruction. Thus both inputs to the multiplexer 22 are 32 bits wide. The multiplexer then selects between these inputs and supplies one determined by the instruction set type to a long instruction pre-decode unit 26. At the long instruction pre-decode unit 26, the supplied input is loaded to a long instruction register 28 and read out to a long instruction post-decode unit 30 where it can be provided to the ALU for an execution. Such an arrangement is used in a system where, for example, a new 16 bit instruction set, which has much in common with the subset of the regular 32 bit instruction set, has been added. It could be an abridged form of a portion of the instruction set. What is implemented here is the use of one or two 16 bit instruction words to recreate the instructions in the regular 32 bit form. For example, the most common instructions are carefully chosen to fit into a set of instruction patterns that use just one 16 bit instruction word. However, to allow all the required regular 32 bit instructions to be encoded using smaller 16 bit words, additional types of the 16 bit instruction which can actually use two 16 bit words to form a single instruction are included. These two 16 bit word instructions can, in this example, have one of the two forms. In the first set, a second word is used to extend the instructions in a single 16 bit word instruction set. The second form is a new instruction pattern made from two 16 bit words. What is contemplated in the present example is that the 16 bit instruction set is tailored to produce all the bits of the 32 bit instruction set so that a much larger range of the instructions can be supported. This is done by allowing more than one 16 bit instruction to be grouped together to form the 32 bit instruction. This is all done based upon the instruction data patterns and is in principle not related to the selection of the instruction sets.

It is not required for a 16 bit instruction set to be a subset of the 32 bit instruction set. Completely unrelated instruction sets can be supported by the invention.

Whilst using such an arrangement ensures that all the instructions actually executed are the 32 bit wide instructions which feed into the standard instruction decoder of the system. However, this arrangement does add to latency since more clock cycles are taken to load the instruction, or limits the cycle time.

Using the embodiments described above, it is possible to support a plurality of the instruction sets used by a single program, using appropriate ones of the address bits to select between different instruction sets, and therefore to transfer control between different blocks of the code.

It is possible for the instruction sets to be reduced sets of an overall instruction set, or for the instruction sets to be alternative instruction sets which only partially overlap, or in some circumstances may not overlap at all.

Embodiments of the invention can be implemented on a multithreaded microprocessor by appropriate modifications to instruction input pipelines of the types shown in FIGS. 1 and 2.

What is claimed is:

1. A processor, comprising:
an instruction memory storing at least two sets of instructions to be executed by an Arithmetic Logic Unit (ALU), a first set of said at least two sets having a larger number of bits per instruction than a second set of said at least two sets;

an instruction being fetched from said instruction memory by a fetch instruction, said fetch instruction including a fetch instruction address of the instruction to be fetched from said instruction memory, the fetch instruction address comprising one or more predetermined bits identifying whether the instruction to be fetched belongs to said first set or said second set;

a fetched instruction unit configured to receive the instruction fetched from said instruction memory for decoding;

a first decoder configured to receive the fetched instruction from said fetch instruction unit and to decode the instruction using instructions of said first set of instructions;

a second decoder configured to receive the fetched instruction from said fetch instruction unit and to decode the instruction using instructions of said second set of instructions; and an instruction set identifying unit configured to receive said one or more predetermined bits of said fetch instruction address and to determine from said one or more predetermined bits of said fetch instruction address whether the instruction to be fetched in accordance with said fetch instruction belongs to said first set or said second set and to output a signal indicative thereof, wherein when the fetch instruction address relates to an instruction of the second set, the fetch instruction address is modified prior to inclusion in the fetch instruction by logically shifting a predetermined portion of the original fetch instruction address;

wherein said processor is responsive to said signal from said instruction set identifying unit to send to said ALU a decoded instruction from either said first decoder or said second decoder in dependence thereon.

2. The processor according to claim 1 wherein said instruction set identifying unit comprises a logic circuit configured to output a decoding selection signal in response to said one or more predetermined bits, said processor further comprising:

a multiplexer configured to receive decoded instructions from said first decoder and said second decoder, and being responsive to said decoding selection signal to output a decoded instruction from either said first decoder or said second decoder to said ALU for execution in dependence thereon.

3. The processor according to claim 1 wherein said instruction set identifying unit comprises a logic circuit configured to output a decoding selection signal in response to said one or more predetermined bits, said processor further comprising:

a multiplexer configured to receive decoded instructions from said second decoder and the fetched instruction from said fetched instruction unit, and being responsive to said decoding selection signal to output either a decoded instruction from said second decoder or the fetched instruction from said fetched instruction unit to said first decoder for subsequent decoding and output to said ALU for execution.

4. The processor according to claim 1 wherein instructions of said first set of instructions are 32-bit instructions and instructions of said second set of instructions are 16-bit instructions.

5. The processor of claim 1, wherein the fetched instruction unit is further configured to send the instruction fetched from said instruction memory to the first decoder and to the second decoder, the first decoder and the second decoder being further configured to simultaneously decode the instruction fetched from said instruction memory and to give alternative decoded instructions at their outputs.

6. The processor of claim 1, wherein said fetched instruction unit is further configured to send the instruction fetched from said instruction memory to one of the first decoder and the second decoder in dependence on the signal output by the instruction set identifying unit.

7. A method for executing instructions from different instruction sets in a processor, comprising:

storing at least two sets of instructions to be executed by an Arithmetic Logic Unit (ALU), a first set of said at least two sets having a larger number of bits per instruction than a second set of said at least two sets;

fetching a stored instruction by a fetch instruction, said fetch instruction including a fetch instruction address of the stored instruction to be fetched, the fetch instruction address comprising one or more predetermined bits identifying whether the instruction to be fetched belongs to said first set or said second set;

determining from said one or more predetermined bits of said fetch instruction address whether the instruction to be fetched in accordance with said fetch instruction belongs to said first set or said second set and to output a signal indicative thereof;

responsive to said signal, sending to said ALU a decoded instruction from either a first decoder configured to decode the fetched instruction using instructions of said first set of instructions or a second decoder configured to decode the fetched instruction using instructions of said second set of instructions, in dependence thereon, wherein when the fetch instruction address relates to an instruction of said second set, the fetch instruction address is modified prior to inclusion in the fetch instruction by logically shifting a predetermined portion of the original fetch instruction address.

8. The method of claim 7, further comprising outputting a decoding selection signal in response to said one or more predetermined bits; and in response to said decoding selection signal, outputting a decoded instruction from either said first decoder or said second decoder to said ALU for execution in dependence thereon.

9. The method of claim 7, further comprising outputting a decoding selection signal in response to said one or more predetermined bits; and in response to said decoding selection signal, outputting to said first decoder either a decoded instruction from said second decoder or a fetched instruction, for subsequent decoding and output to said ALU for execution.

10. The method of claim 7, wherein instructions of said first set of instructions are 32-bit instructions and instructions of said second set of instructions are 16-bit instructions.

11. The method of claim 7, further comprising sending a fetched instruction to the first decoder and to the second decoder, and simultaneously decoding the fetched instruction at the first decoder and the second decoder to give alternative decoded instructions at their outputs.

12. The method of claim 7, further comprising sending a fetched instruction to one of the first decoder and the second decoder in dependence on the signal.

* * * * *